Figure 1:
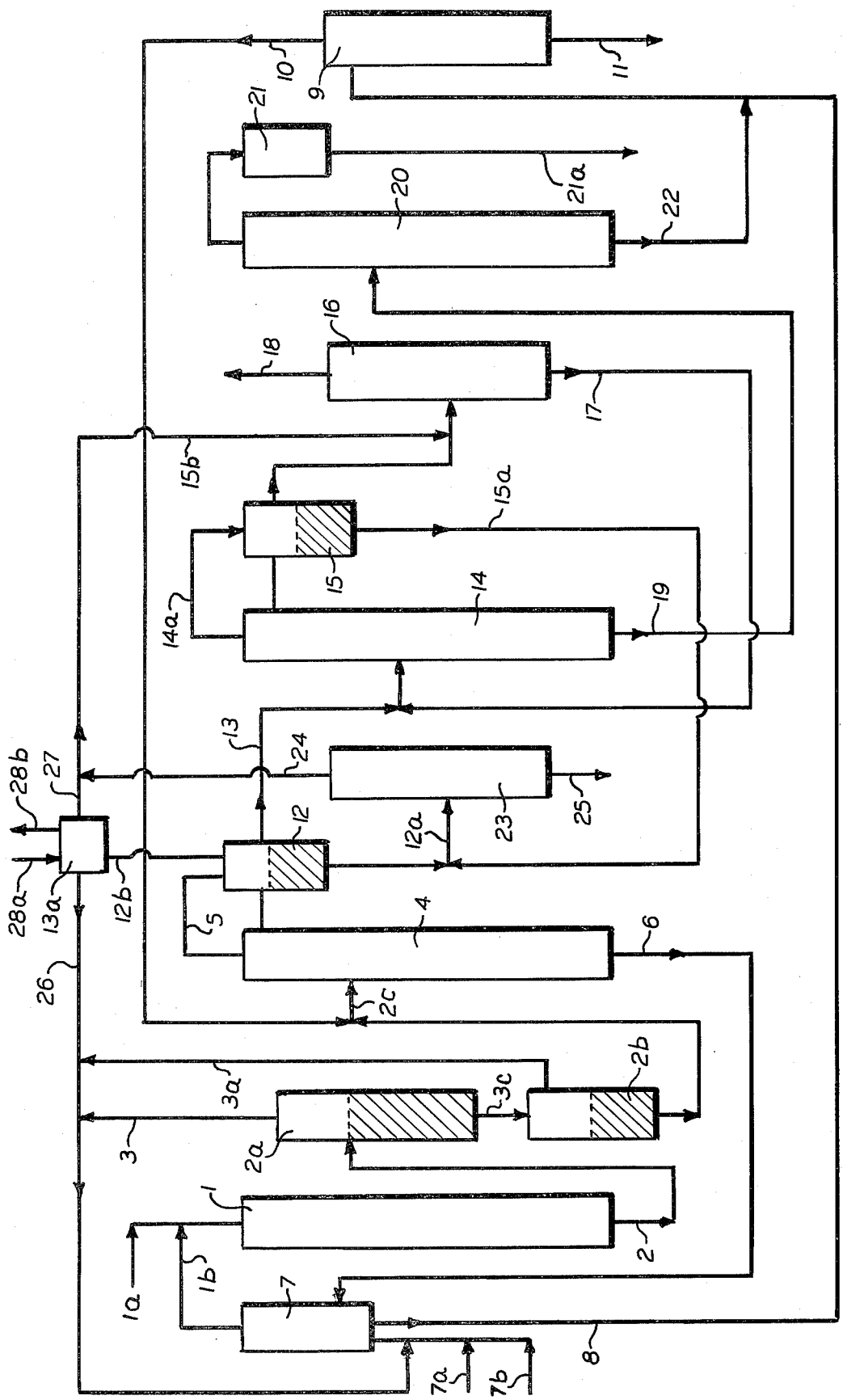

United States Patent [19]
Kronig et al.

[11] 3,905,875
[45] Sept. 16, 1975

[54] PROCESS FOR THE PURIFICATION OF CRUDE LIQUID VINYL ACETATE

[75] Inventors: Walter Kronig, Wiesbaden; Wulf Schwerdtel, Cologne, both of Germany

[73] Assignee: Bayer Aktiengesellschaft, Leverkusen, Germany

[22] Filed: Mar. 15, 1972

[21] Appl. No.: 235,089

Related U.S. Application Data
[63] Continuation-in-part of Ser. No. 822,941, May 8, 1969, abandoned.

[30] Foreign Application Priority Data
May 10, 1968  Germany............................ 1768412

[52] U.S. Cl. .................... 203/71; 203/14; 203/99; 260/497 A; 260/499
[51] Int. Cl. ............................................. C07c 67/06
[58] Field of Search ............ 203/99, 96, 98, 71, 14, 203/DIG. 19; 260/497 A, 499

[56] References Cited
UNITED STATES PATENTS

| | | | |
|---|---|---|---|
| 3,277,158 | 10/1966 | Schaeffer............................ | 260/499 |
| 3,404,177 | 10/1968 | Baba et al..................... | 203/DIG. 19 |
| 3,438,870 | 4/1969 | Roscher et al............... | 203/DIG. 19 |
| 3,458,406 | 7/1969 | Fisher et al.......................... | 203/85 |
| 3,530,044 | 9/1970 | Horn.................................. | 203/99 |

Primary Examiner—Wilbur L. Bascomb, Jr.
Attorney, Agent, or Firm—Burgess, Dinklage & Sprung

[57] ABSTRACT

Crude liquid vinyl acetate comprising as the principal components, vinyl acetate, acetic acid, water, and ethyl acetate, is purified by introducing the liquid vinyl acetate into a single distillation zone, withdrawing an azeotropic mixture consisting essentially of vinyl acetate and water as the head product from said zone, separating said azeotropic mixture into a water phase and a vinyl acetate phase, recycling a sufficient quantity of said vinyl acetate phase to the top of said distillation zone to cause removal, by means of said head product, of a major portion of the water originally contained in the crude liquid vinyl acetate, withdrawing from the bottom of the zone acetic acid substantially free of vinyl acetate and containing from aboout 0.5 to 6% by weight of water and some of the ethyl acetate initially present in said crude liquid vinyl acetate, and withdrawing a side stream comprising ethyl acetate, acetic acid, vinyl acetate, and water from said distillation zone at a point intermediate the eighth and sixteenth distillation trays in said zone.

6 Claims, 2 Drawing Figures

PROCESS FOR THE PURIFICATION OF CRUDE LIQUID VINYL ACETATE

This application is a continuation-in-part of Ser. No. 822,941, filed May 8, 1969, now abandoned.

This invention relates to a process for the purification of crude liquid vinyl acetate; more specifically, the invention relates to the recovery of pure vinyl acetate with a content of from 20 to 1000 ppm ethyl acetate from crude liquid vinyl acetate.

A crude liquid vinyl acetate comprising, as the principal components, vinyl acetate, acetic acid, and water and small quantities of ethyl acetate, is frequently obtained in processes for the production of vinyl acetate. A product such as this is obtained, for example, in the production of vinyl acetate by reacting ethylene with acetic acid and molecular oxygen in the gaseous phase. Elevated temperatures and normal or elevated pressures are used in this process and the reaction is carried out in the presence of a catalyst, for example, a noble metal catalyst. The reaction products are cooled to temperatures around room temperature as they leave the reactor. In this process, excess acetic acid is used and any unconverted acetic acid is recycled to the reactor. Before it is recycled into the reactor, the acetic acid is treated to remove the vinyl acetate, water and polymers present therein, the polymers having been formed by the polymerization of vinyl acetate, either during the reaction or during working-up.

We have now found that crude liquid vinyl acetate which contains, as the additional components, acetic acid and water, and as the principal impurity, small quantities of ethyl acetate, can be purified particularly advantageously by the instant process. Essentially, the instant process comprises subjecting the crude vinyl acetate to an azeotropic distillation in which the crude vinyl acetate reaction product stream is introduced into a distillation column; an azeotropic mixture comprising water and vinyl acetate in withdrawn from the top of the column as the head product and a mixture comprising acetic acid, some of the ethyl acetate, and polymeric material is withdrawn as the bottom product and a side stream comprising ethyl acetate, water acetic acid and vinyl acetate is withdrawn at a point intermediate the eight and sixteenth distillation trays of said column. Vinyl acetate from the head product, which is condensed and in which the resulting phases are separated into a water phase and an organic (vinyl acetate) phase, is recycled to the top of the reaction column in such quantity that an acetic acid almost entirely free of vinyl acetate, and containing 0.5 to 6% percent of water, the eventually formed polymers, is withdrawn from the bottom of the column. The acetic acid obtained as the bottom product may be reused in the production of vinyl acetate, and, for example, in continuous operation, may be directly recycled through an evaporator into the vinyl acetate reactor. The vinyl acetate in the head product is almost entirely free of ethyl acetate almost all of which is removed in side stream.

In particular embodiment, the process according to the invention may be carried out as follows:

A reaction product condensate containing principally acetic acid (45 to 80 percent by weight), from 15 to 35 percent by weight of vinyl acetate and from 3 to 20 percent of water, is obtained by cooling to 20° to 40°C the reaction products from the reaction of ethylene, acetic acid and molecular oxygen or air, carried out at elevated temperature and at normal or elevated pressure in the presence of a catalyst. In addition, the condensate contains varying quantities of ethyl acetate, for example, from 500 to 5000 ppm, based on contained vinyl acetate. This reaction mixture condensate is introduced as the crude feed stream into an azeotropic distillation column, so that all the vinyl acetate present in the feed and a portion of the water present in the feed, such portion corresponding to the quantity of water formed during the reaction, are removed overhead. The reflux of vinyl acetate into the azeotropic distillation column is regulated in such a way that an average quantity of water of from 0.5 to 6 percent by weight is maintained in the bottom product acetic acid run-off. In general, a reflux ratio, based on the vinyl acetate removed, of 3 to 8 is of advantage in this distillation which contains about 60 to 70 trays. The acetic acid run-off from the sump of the azeotropic column may contain, for example, from 0.05 to 1.0 percent by weight of polymers formed, for example, by the polymerization of vinyl acetate.

The vinyl acetate removed at the top of the distillation column is separated from its mixture with water, which is also run off overhead. This vinyl acetate is subjected to a second distillation in which dissolved water and low boiling components, mainly acetaldehyde, are azeotropically removed. The vinyl acetate obtained as a bottom product in this second distillation contains small amounts of polymer and traces of acetic acid, which can be removed by redistillation, whereupon a pure vinyl acetate with an ethyl acetate content of from 20 to 1000 ppm is obtained. The head product from said second distillation for the removal of low-boiling components still consists essentially of vinyl acetate. In yet another column, the vinyl acetate is recovered from this head product as the bottom fraction and is recycled to the start of the distillation sequence while the low boiling constituents accumulate as the head product of the column and are removed from the process.

In continuous operation the acetic acid, containing water which accumulates at the bottom of the principal azeotropic distillation column at a temperature of 120°C, may be directly introduced into a pressure evaporator forming part of the reaction system. Evaporation is advantageously carried out in such a way that a previously heated stream of recirculating reactant gas consisting essentially of ethylene is passed through the acetic acid which is kept hot by a recirculation evaporator. In this way, evaporation may be carried out at relatively low temperatures of from 110° to 140°C, which is of considerable advantage in preventing corrosion.

The fresh acetic acid required for the reaction may also be introduced into the pressure evaporator. It has proved advantageous to provide means that protect against spray, for example, a demister, in the upper part of the evaporator containing the gases and the vapors, and to introduce the fresh acetic acid into this demister for washing, in order to prevent the polymers from being entrained by the gas stream and introduced into the reactor.

Liquid acetic acid can be run off from the sump of the evaporator in such a quantity that it has a polymer content of from 1 to 5 percent by weight; that is to say, more than 90 percent of the water-containing acetic acid introduced into the evaporator can be evaporated. This bottom product is worked up by distillation, for example, in a falling-film evaporator. The concentrated polymer accumulates as a residue and the acetic acid recovered is recycled into the process.

The bottom product from the pure vinyl acetate column, which contains the polymers dissolved in the vinyl acetate and formed during redistillation, may be worked up together with the polymer-containing stream from the reaction evaporator in the aforementioned falling-film evaporator. However, the bottom product from the pure vinyl acetate column may also be introduced into the principal azeotropic distillation column and the vinyl acetate present therein thus recovered as distillate.

The organic products present in solution in the water obtained in the principal azeotropic distillation column may be distilled off therefrom and recycled into the purification system, with the result that an affluent containing as its only impurity traces of acetic acid is discharged from the system.

Before it is introduced into the principal azeotropic distillation column, the liquid vinyl acetate feed stream is suitably released to atmospheric pressure, and the dissolved gases liberated thereby may be suitably reintroduced into the recycle reactant gas in a convenient manner.

The small quantities of gases which remain in solution in the liquid feed stream at atmospheric pressure flow off overhead during the azeotropic distillation and are separated from the condensed products in the condenser. These gases may then be cooled to temperatures around 0°C, the cooling causing the condensation of acetaldehyde and other low-boiling components together with vinyl acetate. This condensate is introduced into the above mentioned second distillation column for separating the low boiling products.

It is also possible to separate the gases that have remained in solution in the reaction product condensate in a stripper before the feed stream is introduced into the azeotropic distillation column.

In continuous operation of the process according to the invention, therefore, the acetic acid is not recycled into the production of vinyl acetate in the form of an acetic acid which is almost entirely free of water, as would be desirable in respect to the evaporation and condensation energy involved, but instead the recycled acetic acid has a water content between 0.5 to 6 percent e.g. from 1 to 3 percent. (The quantity of water to vinyl acetate effectively removed from the reaction product is, of course, constant because in any case the water newly formed during the reaction has to be removed.) This acetic acid may be recycled without further purification into the production of vinyl acetate through the pressure evaporator referred to above.

A side stream rich in ethyl acetate is taken from the principal azeotropic distillation column. The ethyl acetate in such side stream can be separated by a subsequent distillation from the acetic acid also contained in this side stream.

As already mentioned, the crude vinyl acetate which is to be worked up in accordance with the invention accumulates, for example, in the production of vinyl acetate by the reaction of ethylene with acetic acid and oxygen in the gaseous phase at an elevated temperature of, for example, from 50° to 300°C, and at normal or elevated pressure of, for example, from 1 to 20 atmospheres or above, in the presence of catalysts. Noble metal catalysts on supports are normally used as the catalysts. Particularly suitable noble metals include those of the VIIIth Group of the Periodic Table, for example, palladium or platinum, which may be present, for example, in quantities of from 0.5 to 10 grams, advantageously from 1 to 5 grams, in a 1 liter bulk volume of the catalyst. The catalysts may contain further constituents such as, for example, gold, ruthenium, rhodium, iridium, copper, chromium, molybdenum, tungsten, magnese, rhenium, iron, cobalt or nickel. In addition, the catalysts may contain, for example, from 1 to 20 percent by weight of acetates, for example, the acetates of lithium, sodium or potassium. It is also possible to start with other compounds of these alkali metals which are converted into alkali metal acetates under the reaction conditions. Furthermore, small quantities of alkali metla acetates may be added to the gaseous mixture entering the reactor in order to maintain the concentration of the alkali metal acetates in the reaction zone. Substances which do not lose of their mechanical strength under the effect of the acetic acid under the reaction conditions represent particularly suitable catalyst supports. Silica, silicates, aluminum oxide and spinels of aluminum oxide, are suitable supports.

Figure 2:
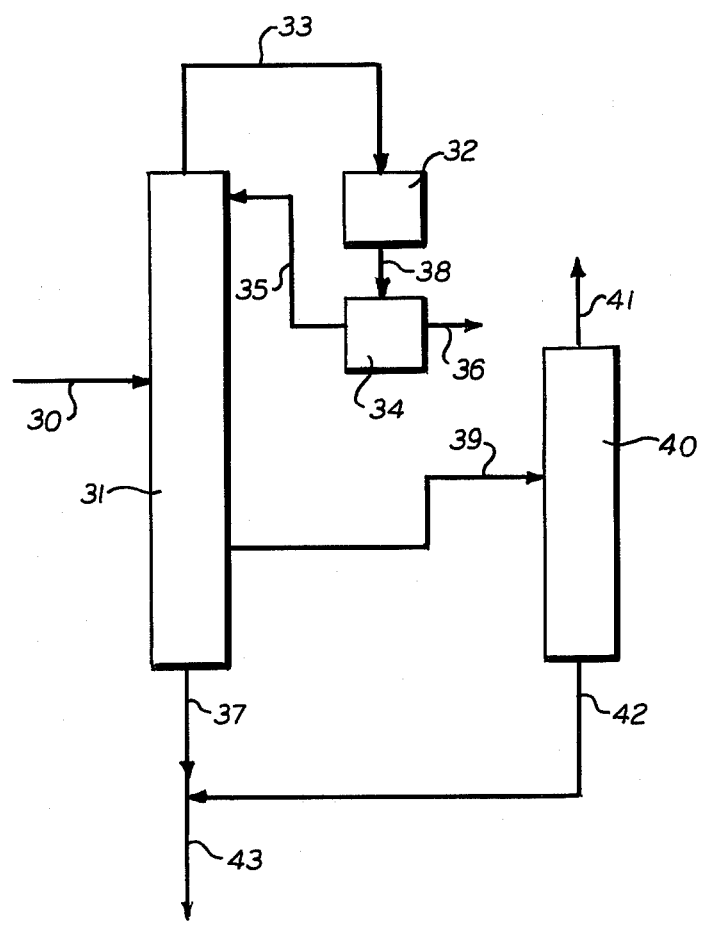

The invention is illustrated by the following examples with reference to the accompanying drawings in which:

FIGS. 1 and 2 are flow sheets of two embodiments of the process according to the invention (FIG. 1 relates to Example 1 and FIG. 2 relates to Example 2 to 4).

EXAMPLE 1

With reference to FIG. 1, the reaction of ethylene, oxygen and acetic acid to form vinyl acetate was carried out over a fixedly arranged noble metal catalyst on a support in a reactor 1 at a temperature of 185°C and a pressure of 8 atoms.

On leaving the reactor 1, to which the oxygen was delivered directly through a conduit 1a and the acetic acid together with the ethylene was fed from the reaction evaporator 7 through 1b, the reaction mixture leaving the reactor through 2 was cooled to 30°C (cooler and condenser not shown in the drawing) and transferred to a separator 2a in which the condensed liquid components were separated from the components remaining in the gaseous phase. The gases are recycled into the process through 3. The condensate leaving the separator 2a through 3c was released to atmospheric pressure in the separator 2b and delivered through a conduit 2c to the distillation column 4 for working up. The gases liberated during releasing were compressed (compressor not shown in the drawing) to the reaction pressure and were then also reintroduced through 3a into the reactor 1 via the evaporator 7.

The product fed from the separator 2b to the distillation column 4 has the following composition:

| | % by weight | kg/h |
|---|---|---|
| Ethylene | 0.19 | 0.041 |
| Carbon dioxide | 0.49 | 0.104 |
| Vinyl acetate | 21.38 | 4.534 |
| Acetic acid | 70.85 | 15.034 |
| Water | 6.81 | 1.443 |
| Ethyl acetate | 0.04 | 0.008 |
| Acetaldehyde | 0.23 | 0.048 |
| Low-boiling constituents | 0.01 | 0.002 |
| | 100.00 | |

In the distillation column 4 the water newly formed during the reaction was removed as head product at 5 together with the vinyl acetate formed. The sump temperature was 125°C, the head temperature 70°C and the reflux ration 1:5.

The acetic acid to be re-used in the reaction was run off at 6 from the sump of the column 4. It has the following composition:

|  | % by weight | kg/h |
|---|---|---|
| Acetic acid | 97.64 | 15.034 |
| Water | 1.98 | 0.305 |
| Polymers | 0.34 | 0.053 |
| Ethyl acetate | 0.04 | 0.007 |
|  | 100.00 |  |

This acetic acid was delivered hot into the reaction evaporator 7 to which fresh acetic acid and ethylene were delivered through conduits 7a and 7b, respectively. In order to avoid an accumulation of polymers in the evaporator 7, a return stream of 1.851 kg/h was recycled through 8 to a falling-film evaporator 9. 1.605 kg/h of the acetic acid fed were recovered at 10 in this falling-film evaporator and reintroduced in the distillation column 4 through 2c. The rest was rejected as polymer at 11.

The head product leaving the azeotropic distillation column 4 at 5 was separated into a lower aqueous phase and an upper organic phase in the separator 12. The organic phase in 12 was found by analysis to have the following composition:

|  | % by weight | kg/h |
|---|---|---|
| Vinly acetate | 98.29 | 4.274 |
| Water | 1.05 | 0.046 |
| Ethyl acetate | 0.02 | 0.001 |
| Acetaldehyde | 0.59 | 0.026 |
| Low-boiling components | 0.05 | 0.002 |
|  | 100.00 |  |

This upper phase (crude vinyl acetate) was introduced into another column 14 through 13 in order to remove more water and to separate all the low-boiling components. The overhead product was introduced in a decanter 15. The upper phase in the separator 15 contained about 10% acetaldehyde, the rest consisted essentially of vinyl acetate. The lower aqueous phase in separator 15 was fed to the column 23 via 15a, to be mentioned.

The upper phase of the head product in separator 15 was fed to column 16 via 15b. The vinyl acetate obtained as a tail product at the bottom of 16 was recycled into the distillation column 14 via 17. The low-boiling components were run off overhead and removed from the process through 18.

The vinyl acetate obtained as a tail product in the column 14 was now dry and free from all low-boiling products, but still contained small quantities of acetic acid and polymers. These compounds were removed by redistillation in the column 20 to which the product was fed through 19. The vinyl acetate obtained as the finished product was condensed at 21 and taken off through 21a. It satisfied all specifications. It has an ethyl acetate content of at the most 0.02 %.

The tail product from the vinyl acetate redistillation 20 was also passed through the falling-film evaporator 9 via 22 in order to recover from the polymer-containing product the vinyl acetate present which was recycled to the distillation column 4 through pipe 10.

The lower aqueous phases in the separator 12 of the first column 4 and in the separator 15 of column 14 contained, in addition to small quantities of other impurities, approximately 1% of vinyl acetate in solution. The water was introduced to column 23 via 15a resp. 12a. All the volatile organic constituents were driven off via 24 by stripping in the column 23 so that from the process as a whole a waste water was obtained containing as impurity only traces of acetic acid. This water is taken off through 25.

The organic compounds taken out as overhead product from column 23 were recycled into the column 16 via 24 in which all the low-boiling constituents were run off overhead and taken off via 18.

The gases which, following release of the cold liquid reaction products, still remained dissolved in the liquid feed to the column 4 were liberated in the column 4. These gases escaped overhead from the phase separator 12 via 12a. They were cooled to 0°C with brine in 13a to isolate entrained acetaldehyde and vinyl acetate, and were then admixed with the remaining residual gas and recycled to the evaporator 7 via 26. (Brine in and out 28a, 28b)

The small quantities of liquid products which were condensed out at by the cooling in 13a were returned via 27 to the column 16 in which all low-boiling components were removed overhead via 18. (Most heat exchangers, coolers, condensors, reboilers etc. not shown in the drawing. 29 is showing the take out of ethyl acetate as described in example 4.)

EXAMPLE 2

With reference to FIG. 2, 2000 g/hour of a mixture with the following composition were introduced through pipe 30 at the 30th tray of a 60-tray laboratory bubble-tray column of glass (31):

| Vinyl acetate | 15.98% by weight |
|---|---|
| Ethyl acetate | 0.02% by weight |
| Water | 6.00% by weight |
| Acetic acid | 78.00% by weight |

The head product through 33 was condensed (32), cooled to 40°C (32), and transferred through 38 to a phase separator (34). 2400 g/hour of the vinyl acetate phase were pumped as recycle components through 35 to the head of the column, the rest being removed as crude vinyl acetate through 36. Its concentration was as follows:

| Vinyl acetate | 98.59% by weight |
|---|---|
| Ethyl acetate | 0.01% by weight |
| Water | 1.40% by weight |

The tail product of the column through 37 had the following composition:

| Vinyl acetate | 0.01% by weight |
|---|---|
| Ethyl acetate | 0.02% by weight |
| Water | 2.00% by weight |
| Acetic acid | 97.97% by weight |

EXAMPLE 3

2000 g/hour of a mixture with an ethyl acetate content three times greater than that of the mixture of Example 2 were introduced through 30 (drawing 2) into a test column (31) of the kind described in Example 2. The mixture had the following composition:

| | |
|---|---|
| Vinyl acetate | 15.94% by weight |
| Ethyl acetate | 0.06% by weight |
| Water | 6.00% by weight |
| Acetic acid | 78.00% by weight |

After the head product through 31 had been condensed (32) and cooled, 2200 g/hour of the vinyl acetate phase were pumped through 35 as a recycle component from the separator to the head of the column. The crude vinyl acetate at the head of the column through 36 then contained:

| | |
|---|---|
| Vinyl acetate | 98.55% by weight |
| Ethyl acetate | 0.05% by weight |
| Water | 1.40% by weight |

In this test, the tail product through 37 had the following composition:

| | |
|---|---|
| Vinyl acetate | 0.02% by weight |
| Ethyl acetate | 0.06% by weight |
| Water | 2.75% by weight |
| Acetic acid | 97.17% by weight |

EXAMPLE 4

Under the same feed conditions as in Example 3, 14 g/hour of a liquid side stream through 39 of the following composition were run off from the 15th tray of the test column:

| | |
|---|---|
| Vinyl acetate | 1.0% by weight |
| Ethyl acetate | 5.0% by weight |
| Water | 11.0% by weight |
| Acetic acid | 83.0% by weight |

With this procedure, the crude vinyl acetate at the head of the column through 36 contained:

| | |
|---|---|
| Vinyl acetate | 98.58% by weight |
| Ethyl acetate | 0.02% by weight |
| Water | 1.40% by weight |

The sump product through 37 had the following composition:

| | |
|---|---|
| Vinyl acetate | 0.02% by weight |
| Ethyl acetate | 0.03% by weight |
| Water | 2.00% by weight |
| Acetic acid | 97.96% by weight |

The side stream was then delivered to a second column (40) in which the vinyl acetate and ethyl acetate present in it were distilled overhead as an azeotropic fraction (41) together with the water. The acetic acid (42) which was run off from the sump of this column was added to the sump product from the first column. The combined product went through 43.

EXAMPLE 5

2000 g/hour of the same mixture as used in Examples 1, 3 and 4 were introduced at the 30th tray of a 60-tray test column.

2200 g/hour of the vinyl acetate phase from the separator were used as the recycle component as in Example 3. In this test, the quantities in which the head and tail products were removed from the column were adjusted in such a way that a fairly large quantity of vinyl acetate was removed with the acetic acid from the sump.

In this procedure, the composition of the vinyl acetate at the head of the column was as follows:

| | |
|---|---|
| Vinyl acetate | 98.57% by weight |
| Ethyl acetate | 0.03% by weight |
| Water | 1.40% by weight |

The concentration of the bottom product was as follows:

| | |
|---|---|
| Vinyl acetate | 2.00% by weight |
| Ethyl acetate | 0.07% by weight |
| Water | 2.50% by weight |
| Acetic acid | 95.43% by weight |

It will be understood that the above description of specific embodiments of this invention is given by way of illustration and that other embodiments utilizing this invention will be apparent to the worker skilled in the art.

What is claimed is:

1. A process for the purification of crude liquid vinyl acetate containing, as the major impurities, acetic acid, water and small amounts of ethyl acetate, which process comprises introducing said crude liquid vinyl acetate into a single distillation, withdrawing an azeotropic mixture consisting essentially of vinyl acetate and water as the head product from said zone, separating said azeotropic mixture into a water phase and a vinyl acetate phase, recycling a sufficient quantity of said vinyl acetate phase to the top of said distillation zone to cause removal, by means of said head product, of a major portion of the water originally contained in the crude liquid vinyl acetate, withdrawing from the bottom of the zone acetic acid substantially free of vinyl acetate and containing from about 0.5 to 6 percent by weight of water and some of the ethyl acetate initially present in said crude liquid vinyl acetate, and withdrawing a side stream comprising ethyl acetate, acetic acid, vinyl acetate, and water from said distillation zone at a point intermediate the eighth and sixteenth distillation trays in said zone.

2. Process as claimed in claim 1 wherein the said acetic acid withdrawn from the bottom of the zone contains from about 1 to 6 percent by weight of water.

3. Process as claimed in claim 1 wherein the said acetic acid withdrawn from the bottom of the zone contains from about 2 to 6 percent by weight of water.

4. Process as claimed in claim 1 wherein said zone comprises about 60 to 70 distillation trays.

5. Process as claimed in claim 1 wherein said side stream is distilled to substantially remove the ethyl acetate and the vinyl acetate therefrom as overhead product from the acetic acid.

6. Process as claimed in claim 1 wherein the acetic acid withdrawn from the bottom of said zone is recycled to a reaction system wherein vinyl acetate is produced by reacting ethylene acetic acid and oxygen.

* * * * *